United States Patent [19]

de Jong

[11] 4,414,481
[45] Nov. 8, 1983

[54] STATOR FOR ROTATING ELECTRIC MACHINE

[75] Inventor: Gerrit de Jong, Maurepas, France

[73] Assignee: Societe Anonyme Francaise du Ferodo, Paris, France

[21] Appl. No.: 269,552

[22] Filed: Jun. 2, 1981

Related U.S. Application Data

[63] Continuation of Ser. No. 60,738, Jul. 25, 1979, abandoned.

[30] Foreign Application Priority Data

Jul. 31, 1978 [FR] France .................. 78 22642

[51] Int. Cl.³ .......................................... H02K 5/00
[52] U.S. Cl. ................................... 310/42; 310/89; 310/154
[58] Field of Search ............... 310/42, 154, 89, 72

[56] References Cited

U.S. PATENT DOCUMENTS

| 3,048,722 | 8/1962 | Baron ................. | 310/72 |
| 3,156,838 | 11/1964 | Winther ............... | 310/42 |
| 3,548,229 | 12/1970 | Evans ................. | 310/89 |
| 3,760,209 | 9/1973 | Hult .................. | 310/894 |
| 4,074,159 | 2/1978 | Robison ............... | 310/154 |

Primary Examiner—Donovan F. Duggan
Attorney, Agent, or Firm—Eyre, Mann, Lucas & Just

[57] ABSTRACT

A rotating electric machine stator, the casing of which is formed by the assembly of two elements made from a plastics material of from another non magnetizable material;

it comprises a holding part made integrally from a magnetizable material for forming a closed circuit for the magnetic field flux generated by the inductive means said piece being mounted on the outer surface of the casing in order to maintain the two elements applied one against the other.

10 Claims, 28 Drawing Figures

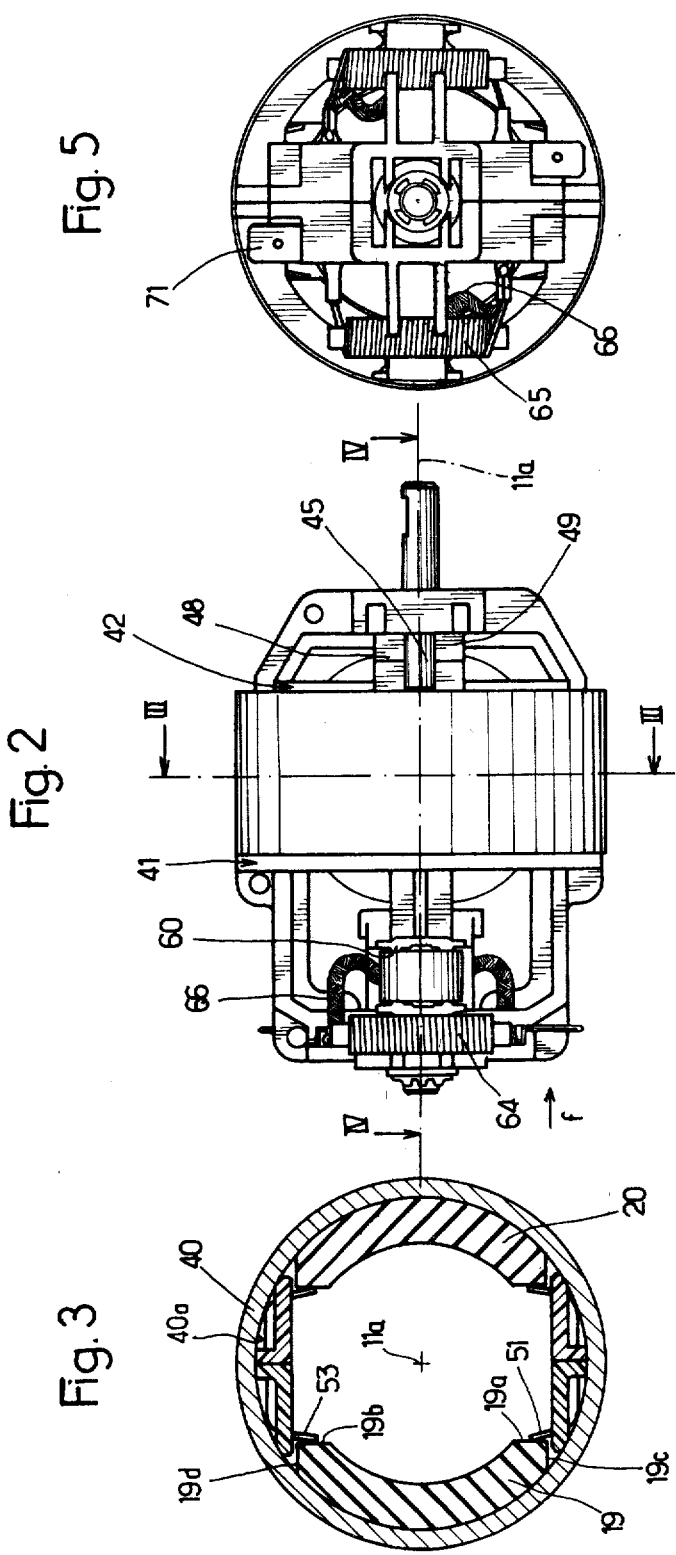

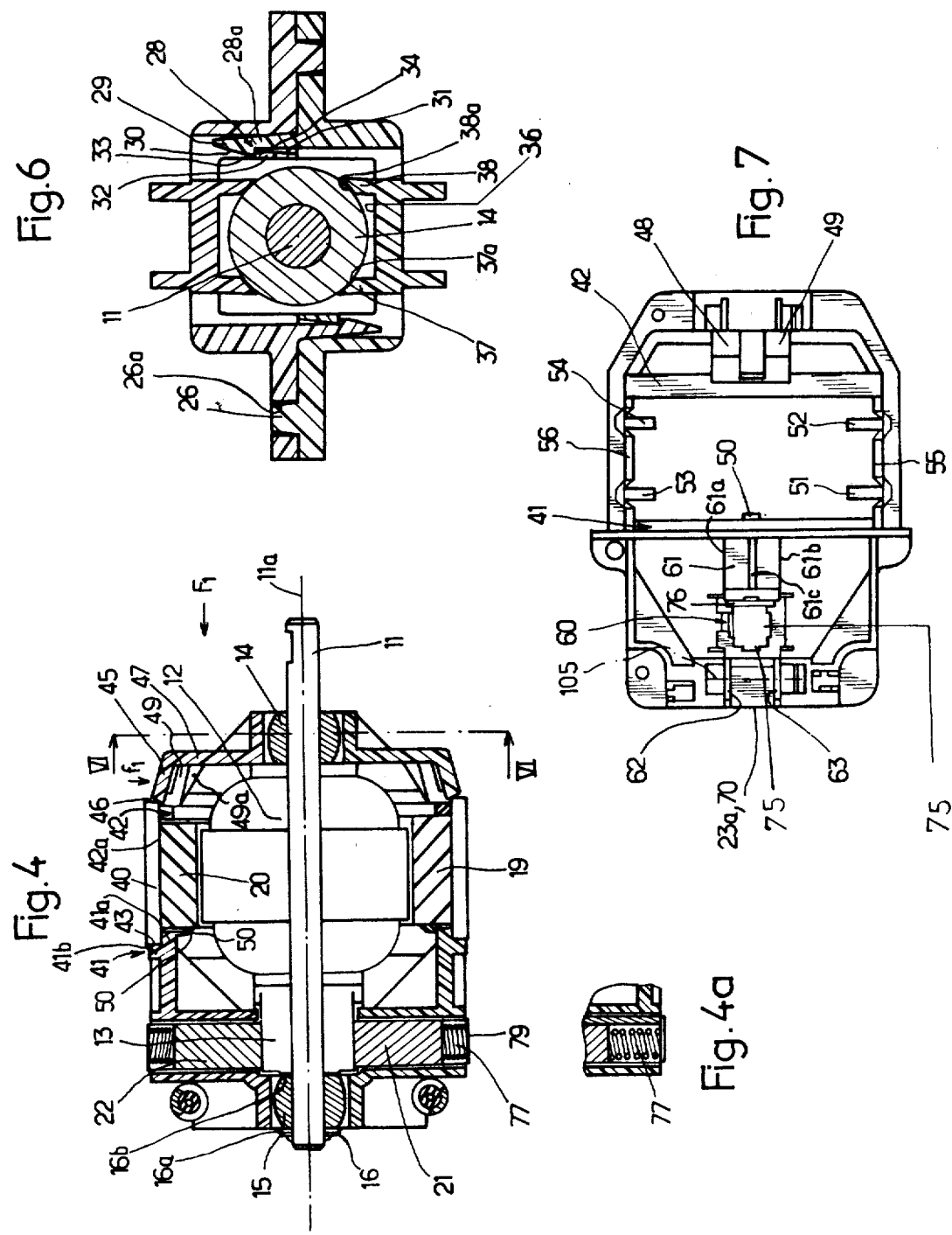

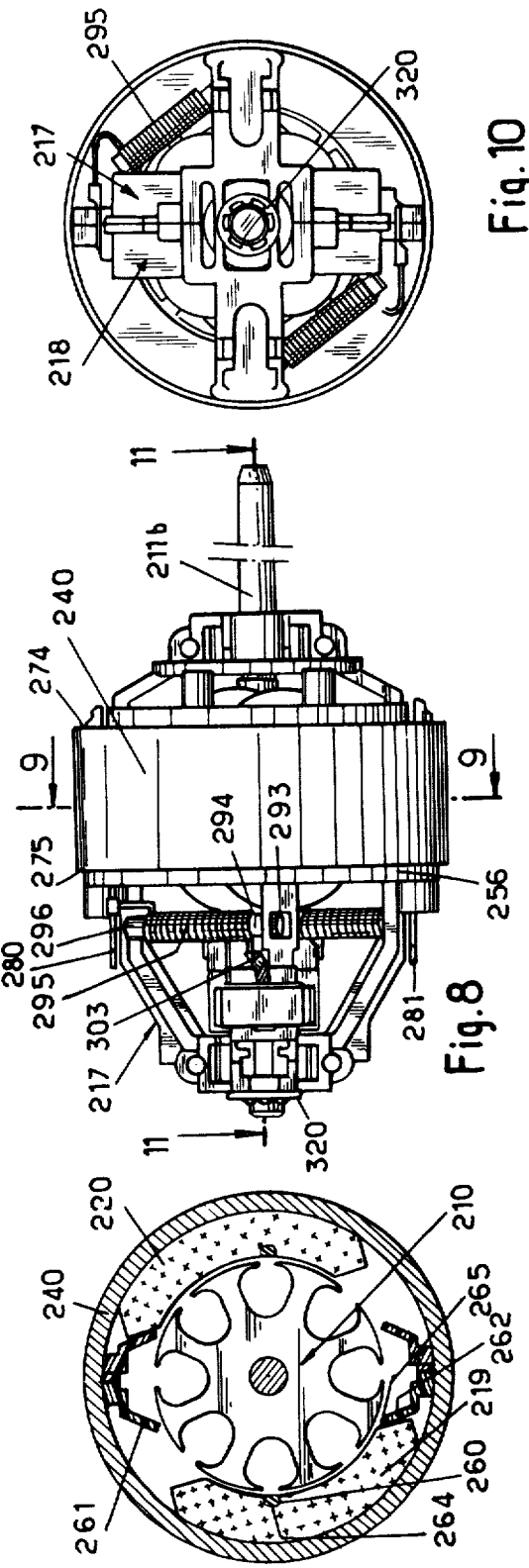
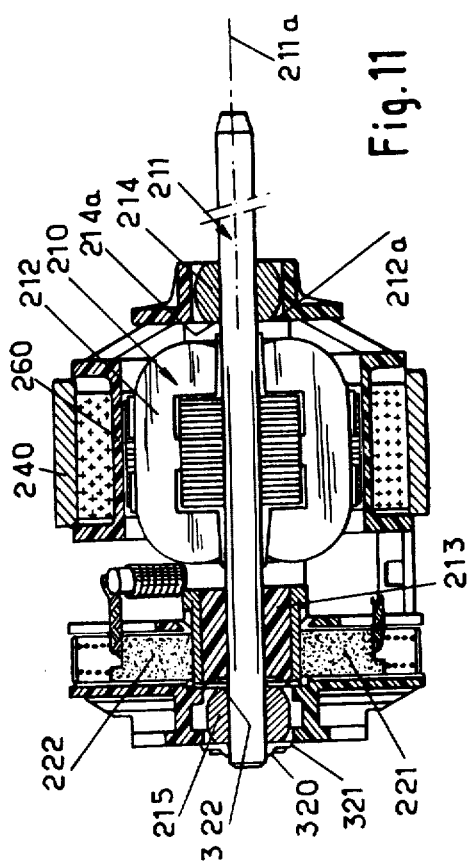
Fig. 10
Fig. 11
Fig. 8
Fig. 9

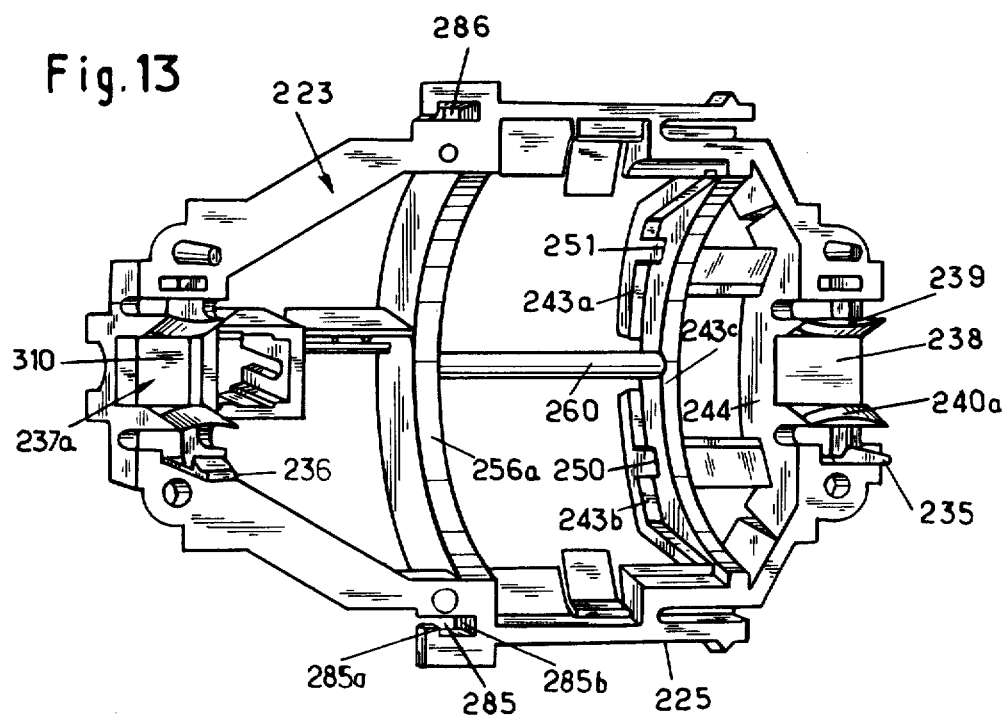
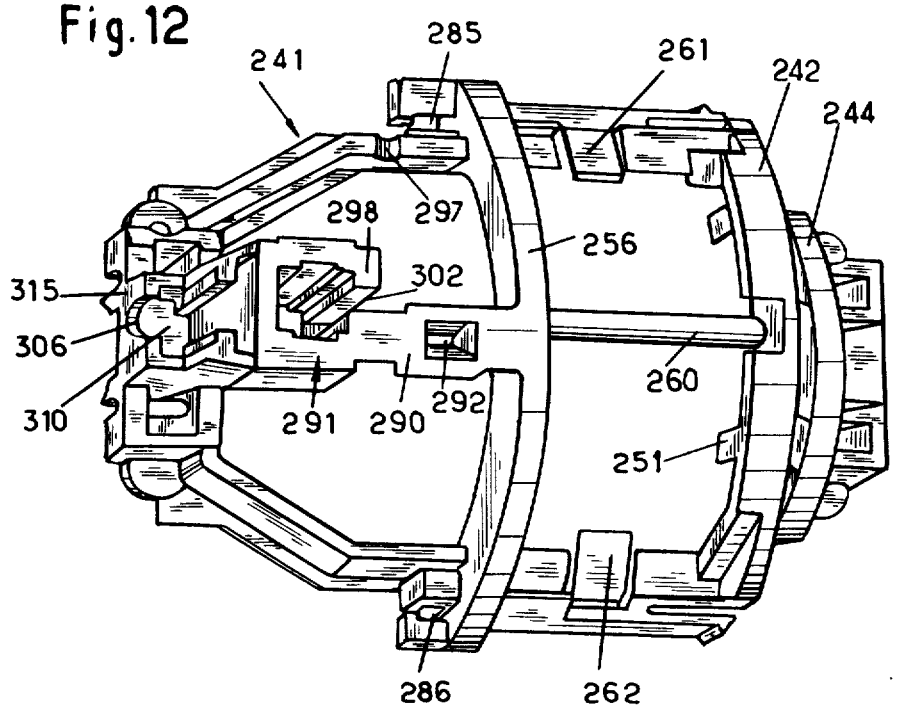

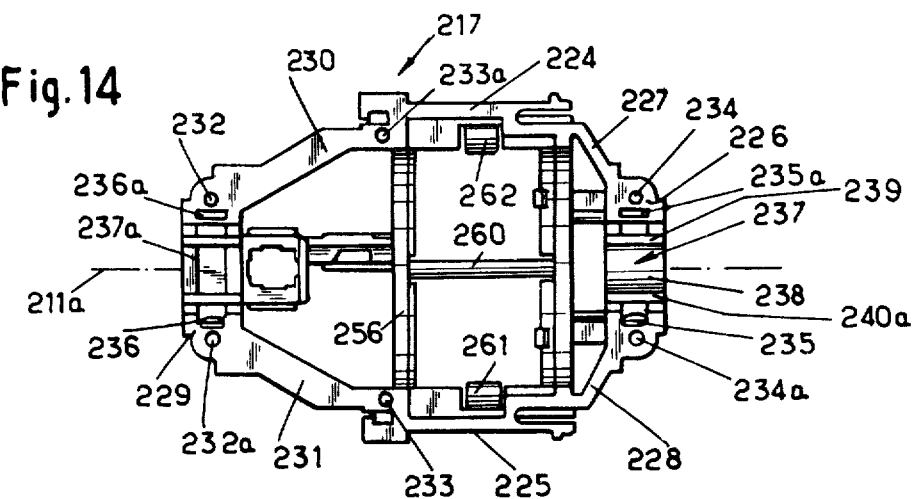
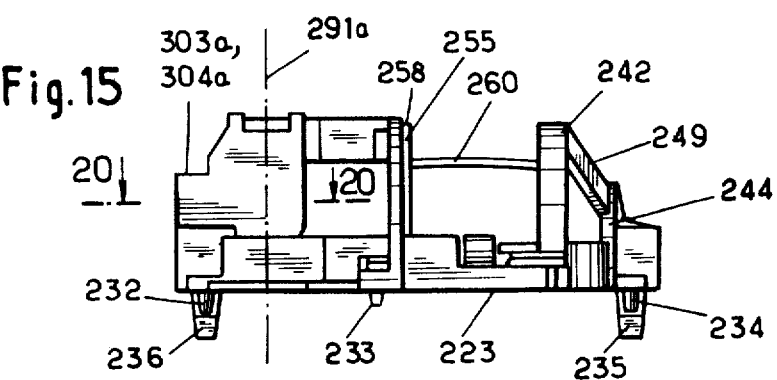
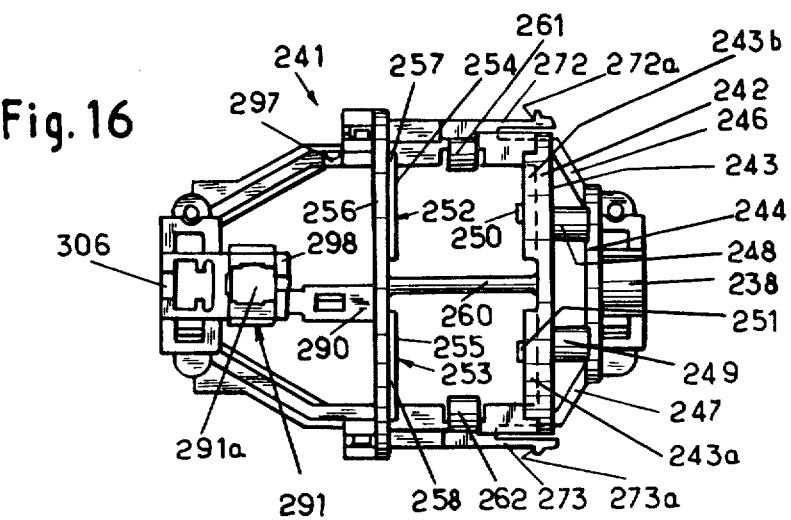

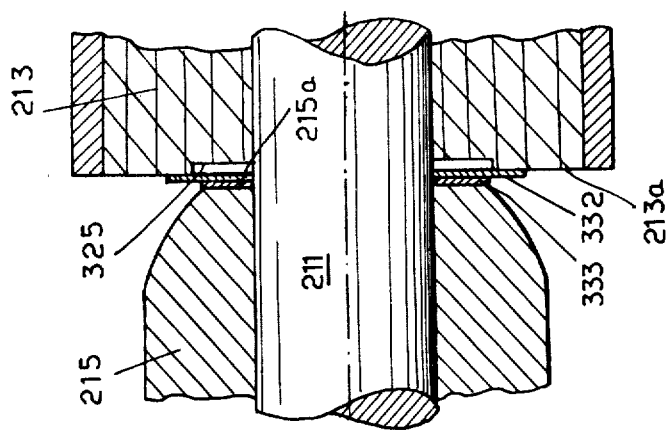
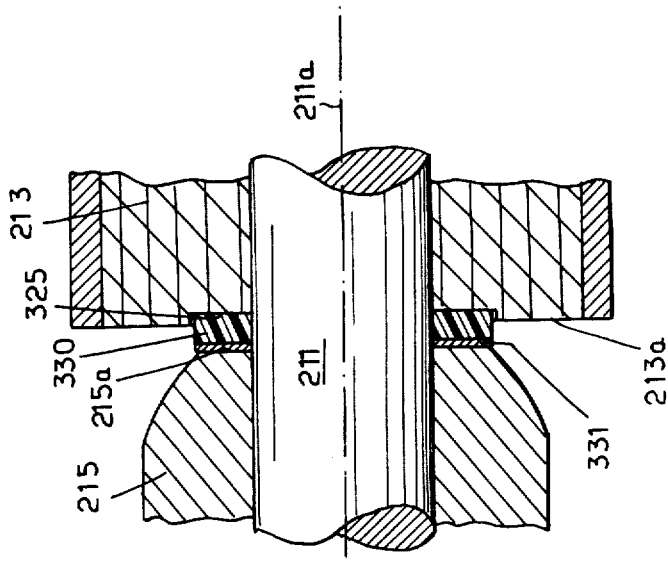
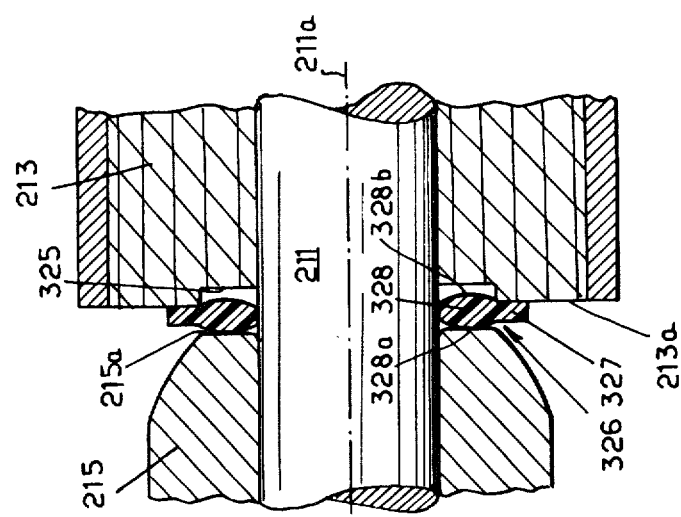

STATOR FOR ROTATING ELECTRIC MACHINE

This is a continuation of application Ser. No. 060,738, filed July 25, 1979 now abandoned.

The present invention relates to the stator of a rotating electric machine the casing of which is formed by the assembly of two elements made of a plastics material or of any other material which is not magnetizable.

The expression "rotating electric machine" means here a motor or a generator.

In a stator of a known d.c. machine of said type, the two elements of the casing are identical and the inductor is made of permanent magnets housed in the half casings and held in the latter by two half yokes and by being imbedded in a plastics material. The assembly of such a motor is relatively complex.

The invention remedies this disadvantage and provides a stator for a rotating electric machine of the hereabove defined type, particularly a d.c. machine, which is of simple and economical manufacture.

The stator according to the invention is characterized in that it comprises a holding part formed as a single part and mounted on the outer surface of the casing for maintaining its two elements fixedly connected to each other, said part being made of a magnetizable material for forming a closed circuit for the magnetic field flux generated by the inducting means.

Such a stator is of easy manufacture and particularly robust.

Moreover, since the magnetic field flux is closed, the yield of the motor equipped with such a stator is superior to that of the previously known motor in which the magnetic field flux is not closed, the magnetic circuit being interrupted by a separation joint between the two half yokes.

In an embodiment, the stator is provided for a collector machine, each element of the casing being provided with a housing for a current-collecting brush, and the inducting means comprise at least a permanent magnet in each element of the casing and each of said elements comprises a portion adapted for being engaged into a groove or with a rib of the magnet for determining the angular position of said magnet relative to the casing and thereby relative to the brushes, so that the modification of this position may be effected by replacing the magnet. Preferably, in this case, each magnet is formed with a groove and the corresponding casing element with a bar cooperating with said groove, and said bar being radially resilient for applying the magnet against the inner face of the holding part.

Further characteristics and advantages of the invention will become more apparent from the following description of some of its embodiments, reference being made to the accompanying drawings wherein:

FIG. 2 is an elevation view of the motor shown in FIG. 1;

FIG. 3 is a sectional view along line III—III of FIG. 2;

FIG. 4 is a sectional view along line IV—IV of FIG. 2;

FIG. 4a shows in another position a portion of the motor shown in FIG. 4;

FIG. 5 is a side view along arrow f of the motor shown in FIG. 2;

FIG. 6 is a sectional view at a larger scale along line VI—VI of FIG. 4;

FIG. 7 is an elevation view of a casing element of the motor shown in FIG. 1;

FIG. 8 is a plan view of another embodiment of a motor according to the invention;

FIG. 9 is a sectional view along line 9—9 of FIG. 8;

FIG. 10 is an end side view of the shaft of the motor shown in FIG. 8;

FIG. 11 is a sectional view along line 11—11 of FIG. 8;

FIG. 12 is a perspective view of an element of the stator casing of the motor shown in FIG. 8;

FIG. 13 is a view similar to that of FIG. 12, but for another position of the casing element;

FIG. 14 shows the inner portion of the casing element shown in FIGS. 12 and 13;

FIG. 15 is a side view of the outer surface of said element;

FIG. 16 is a further view of the outer surface of said casing element;

FIGS. 24, 25 and 26 are sectional views at a larger scale showing the shaft, a bearing, the collector and three embodiments of an intermediate part between the bearing and the collector of the motor shown in FIGS. 8 to 11.

Figure 1:
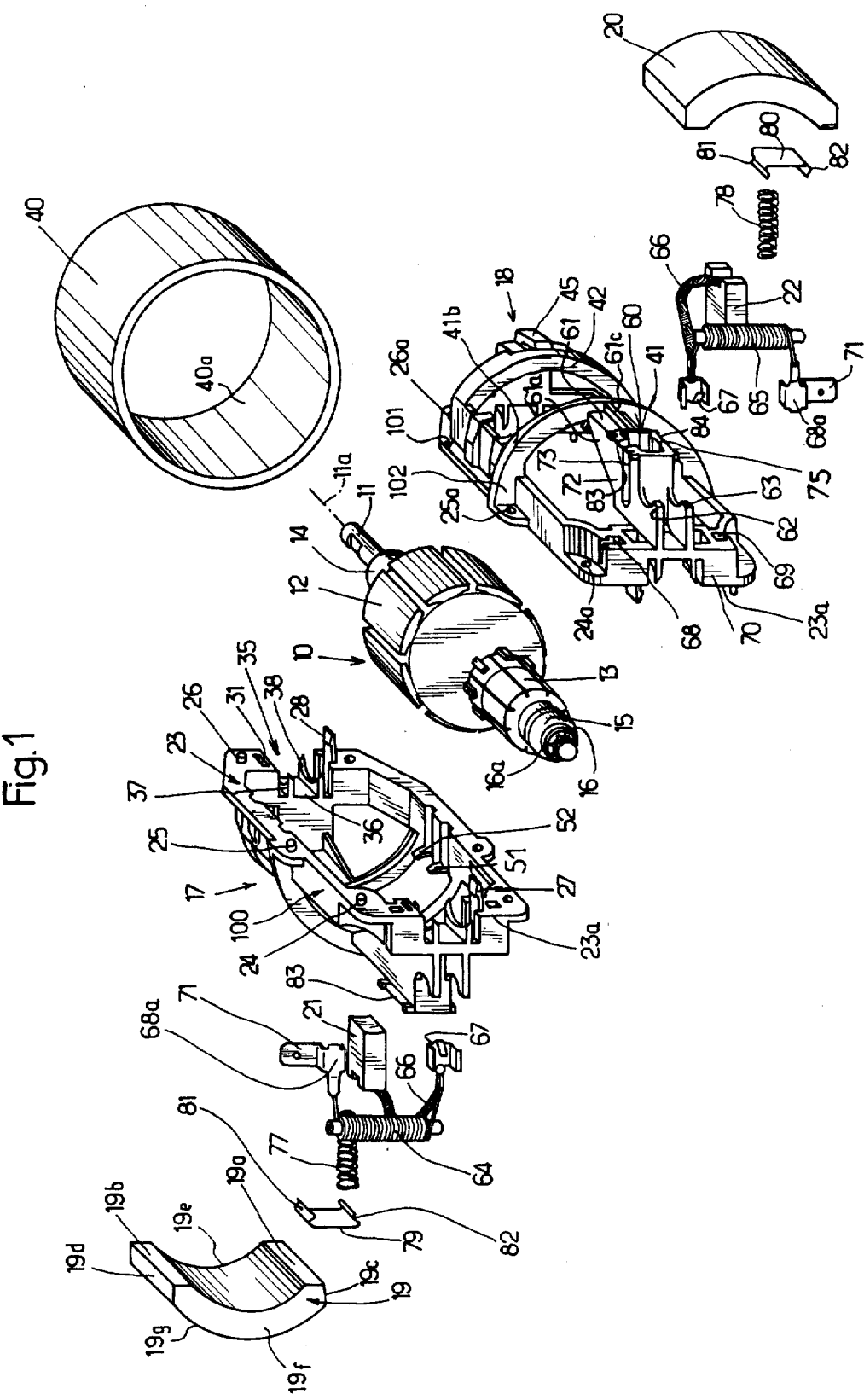
FIG. 1 is a perspective exploded view showing the various parts of a motor according to the invention.
Figure 22:
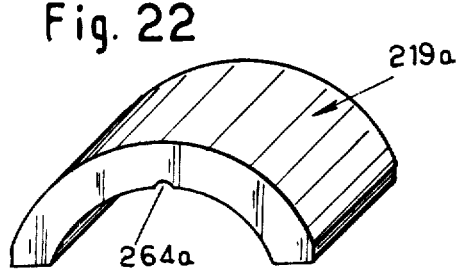
FIGS. 22 and 23 show other magnets which can be used in the motor shown in FIGS. 8 to 11.
Figure 17:
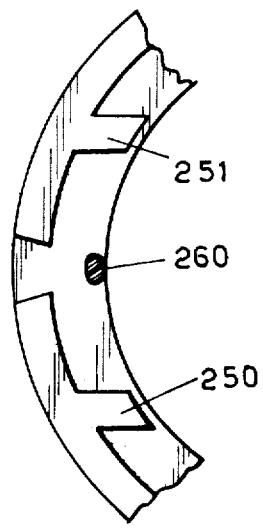
FIG. 17 is a view at a larger scale of a portion of the casing element shown in FIGS. 12 to 16.

The embodiments of the invention which will now be described are collector d.c. electric motors usable as far motors for the air-conditioning installation of a motor vehicle. However, the invention is of course not limited to such an application.

Reference is first being made to FIGS. 1 to 7.

The motor comprises a rotor 10 having, mounted on a shaft 11 (FIGS. 1 and 4), an armature 12 and a collector 13. On either side of the assembly formed by the armature 12 and the collector 13, the shaft 1 is supported by bearings 14 and 15 which are part of the stator and the outer shape of which is that of a sphere or of a cylinder centered on axis 11a of shaft 11 and limited each by two planar faces perpendicular to said axis. The bearing 15 is mounted at the end of the collector 13, whereas the bearing 14 is mounted on the portion of the shaft 11 which extends over the armature 12 on the opposite side of the collector 13.

For preventing the axial displacement of the rotor relative to the stator, a transverse face of the bearing 15 is applied against an end transverse face of the collector 13 through a washer 16b made of a material with a low friction coefficient such as "nylon" or "teflon", and on the shaft 11 is mounted a metallic washer 16 applied against the other transverse face of the bearing 15 through a further washer 16a made of a material exhibiting a low friction coefficient. As an alternative (not shown), the washers 16 and 16a are omitted but a washer which is rigidly connected to the shaft is interposed between the armature and a transverse face of the bearing 14.

Moreover, the motor stator comprises two half casings 17 and 18 made from a plastics material (non magnetisable) which are identical and each of which houses, in addition to the rotor 10, a permanent magnet, respectively 19 and 20, as well as a brush, respectively 21 and 22. Finally, a ring 40 made from soft iron (FIGS. 1 and 3) forms a part or ring surrounding the half casings 17 and 18 and contributes to the assembly of the latter. Moreover, said ring 40 closes a circuit of the magnetic field generated by the permanent magnets 19 and 20.

The two half casings are identical to each other, and the same constituant parts will be designated by the same reference numerals.

Each of said half casings is formed with a planar base 23 of substantially rectangular general shape, which is adapted for being applied against the corresponding base of the other half casing and snapped in engagement with it. The mid-perpendicular of the two smaller sides of the rectangular base 23 is merged with the motor axis 11a. This base is formed, on the one hand, from sections of the branches of a frame 100 of substantially parallelepipedal general shape and on the other hand from faces of the edges 101 extending from said frame towards the outside.

For the centering of the two half casings, each of said casings is formed, depending towards the outside of the base 23, with three cylindrical protrusions 24, 25 and 26 adapted for engaging openings 24a, 25a and 26a of the other half casing.

For the snapping engagement of the two half casings, on each small side of the base 23 protrude two lugs 27 and 28 towards the outside which are formed each with a head 29 (a lug 28, FIG. 6), having a thicker portion than the body 28a of the lug and comprising a chamber 30 for the introduction in a corresponding opening 31 of the other half casing. Although the width of the opening 31 is smaller than the thickness of the head 29, it is possible to introduce said head inside the opening 31 since the latter is limited on one side by a wall 32 having a thickness thin enough to be resilient. Moreover, the length of the opening 31 parallel to the axis 11a is larger than the width—said dimension being also considered along the axis 11a—of the lug 23 for facilitating the flexure of wall 32 while introducing the lug 28 in the opening 31. The wall 32 extends, along the direction of the lug 28, over a length which is equal to that of the body 28a and ends therefore into an edge 33 engaging the edge 34 defining the limit between the head 29 and the body 28a.

Between each lug 27 or 28, for instance the lug 28, and the opening 31 of the same half casing which is on the same small side of the base, the half casing is formed with a crenel 35 which provides an indentation in the frame 100. From the bottom 36 of said crenel emerge two ribs 37 and 38 perpendicular to the plane of the base 23 and parallel to axis 11a, ending into concave edges, respectively 37a, 38a (FIG. 6), bevel shaped for mating the outer shape of the corresponding bearing 14 and 15, and forming a housing for the latter.

When the motor is mounted, the half casings being interlocked to each other, the ribs are then slightly bent towards the outside, thereby maintaining the bearing with a tight fit between their concave ends.

The larger sides of the base 23 and of the frame 100 are connected to each other by half crowns 41 and 42, with an axis 11a, their object being to house and maintain the magnets 19 and 20 as well as the ring 40.

The half crown 41 is formed with two portions of different diameters, the portion 41b (FIG. 4) of larger diameter forming up to its limit with the portion 41a of smaller diameter an edge 43 forming an axial abutment for the ring 40. The adjacent ends of the base of portion 41b form ribs 102 at the outside of the frame 100 (FIG. 1).

The other half crown 42 has the same outer diameter as the outer diameter of portion 41a of crown 41; thus, the ring 40 is mounted and rested against the outer surfaces of the half crowns 41a and 42.

On the opposite side of the abutment formed by the edge 43, the ring 40 is maintained in an axial direction by an abutment 45 with a slanting edge 46 (inclined relative to a plane perpendicular to axis 11a), disposed in the vicinity of the half crown 42 outside the space separating the half crowns 41 and 42. Said abutment 45 exhibits, in a radial direction, at least in the direction of arrow $f_1$ (FIG. 4), that is towards axis 11a, resilient characteristics so as to allow the mounting of ring 40 by sliding it in the direction of arrox $F_1$ parallel to the axis. To this effect, said abutment 45 is formed by an oblique finger which is rigidly connected to a radial flange 47 which is connected on the one hand to a small side of the frame 100 and on the other hand to the half crown 42 via two ribbed oblique arms 48 and 49 (FIG. 2) on either side of finger 45.

During the assembly, the ring 40 is slided in the direction of arrow $F_1$ and the finger 45 is retracted in the direction of arrow $f_1$ due to the force applied for sliding the ring 40 and the obliqueness of said finger. The inner face 40a of ring 40 is applied against the outer face of the half crown 42 and against the outer face of the portion 41a of the half crown 41; thus, said ring contributes to maintaining the two half casings one against the other.

The oblique direction of the edge 46 of the abutment 45 allows mounting on a the half casings 17 and 18 rings 40 having variable lengths in the axial direction in order to take account, eventually, of the size dispersions likely to result from inaccuracies of the manufacture of the ring 40.

Each permanent magnet 19, 20 has the shape of a portion of a hollow cylinder centered on axis 11a and ending into planar edges. Edges 19a and 19b (for magnet 19) are in the same plane which is parallel to that of the base 23 of the half casing 17, at a distance from the latter, whereas the planar edges 19c and 19d are parallel to axis 11a but perpendicular to the plane of base 23.

The magnets are housed between the half crowns 41 and 42, one of their transverse faces 19e being abutting against the transverse edge 42a of the half crown 42, whereas the other transverse face 19f is applied against a lug 50 (FIG. 4) which is resilient in an axial direction and extends over the crown 41 in a radial direction towards the inside of the half casing and in an axial direction towards the space separating the half crowns 41 and 42. As an alternative, the lug 50 depends from the haif crown 42.

The edges 19a and 19b sit on four resilient lugs 51, 52, 53 and 54 (FIG. 7) protruding from the upper edges opposite to the base 23 of the two walls 55 and 56 of frame 100 being between the half crowns 41 and 42. Each of said lugs is formed with a portion which is substantially parallel to base 23 and a curved end; said lugs are disposed towards the inside of the frame 100. Finally, the lugs 52 and 54 are in the prolongation of each other; the same applies for the lugs 51 and 53.

The position of said lugs 51 to 54 and the shape and sizes of the magnets are such that, before mounting the ring 40, the outer surface 19g of the magnets is on a cylinder of circular cross-section, with a diameter larger than the diameter of the cylinder formed by the half crown 42 and the portion 41a of the half crown 41. The lugs 50 to 54 allow mounting magnets having variable sizes so as to take in account the dispersion resulting from the manufacturing inaccuracies.

For mounting the ring 40, it is therefore necessary to apply a radial effort, in opposition to the lugs 51 to 54, on the magnets 19 and 20. When the ring 40 is mounted, said magnets are applied by the resilient lugs against the inner surface 40a of ring 40. To this application of the magnets 19 and 20 against the inner face 40a contributes also the magnetizable nature of ring 40.

Between the half crown 41 and the small side 23a of base 23 is disposed a housing 60 for the corresponding brush 21 or 22. Said housing 60 is rigidly connected to the half crown 41 through a wall 61 which is part of the same cylinder as the portion 41a of the half crown 41 and to two ribs 61a and 61b formed on the wall 61 towards the axis 11a on its longitudinal edges, as well as to another longitudinal rib 61c protruding towards the outside of said wall 61; the housing 60 is also rigidly connected to the wall 70 of frame 100 at right angles with side 23a through walls 62 and 63 the ends of which, which are turned towards the outside of the half casing, form a semi-cylindrical cradle for anti-interference inductances 64 and 65.

The axis 105 of the semi-cylindrical cradle is perpendicular to the axis 11a and parallel to the base 23.

The brush 21 (or 22) is connected to a first terminal of the inductance 64 (or 65) through a flexible electrical conductor or braid 66 and a metallic terminal connector 67 housed in a slot 68 of the half casing. The end wire of the inductance 64 and the end of wire 66 are maintained by crimping to a portion of the terminal connector 67.

The other terminal of inductance 64 (or 65) is connected by crimping to another metallic connector 68a housed in another slot 69 of same shape and size as the slot 68. The terminal connector 68a is formed with a lug 71 protruding through the slot 69 and adapted for being connected to an electric energy supply wire.

The slots 68 and 69 are identical and, in projection against the base 23, are situated on either side of the lug 27 and the opening 31.

The housing 60 is formed on its wall 72 which is parallel to the axis which is on the same side as the slot 68 with a radial slot 73 for providing passage for the conductor 66. The more the brush is used, the more the conductor 66 comes closer to the axis by moving inside slot 73.

The housing 60 has a tubular general shape of axis perpendicular to the plane of base 23, and its cross-section has generally the shape of a rectangle. The inner faces of housing 60 are formed with recesses 75 so as to limit the contact surface between the faces of the brush and those of its housing and thereby to reduce the friction.

Grooves formed in the prolongation of a small side of the housing allow housing a wedge 76 when it is desired to introduce in the housing 60 a brush of same width but of more reduced length than that which is normally provided for said housing.

Each brush is maintained in its housing by a spring 77 (for brush 21) or 78 (for brush 22) and a metallic blade or clip 79 or 80 the edges 81 and 82 of which are curved so as to be engaged under the edges 83 and 84 formed on the free end of the longitudinal walls of housing 60. In an embodiment (not shown), the clips 79 and 80 are each formed with a hollow into which is received the end of the corresponding spring (77 or 78) so as to position it in a transverse direction.

The springs 77 and 78 allow applying constantly the brushes, respectively 21 and 22, against the collector 13, in spite of their gradual wear.

In the position shown in FIG. 4, the brushes 21 and 22 have not yet been subjected to wear, whereas in the position shown in FIG. 4a, the brushes are worn out.

The stator of the d.c. motor just described is of a particularly simple and economical manufacture.

The ring 40 the function of which, on the one hand, is to close the circuit of the magnetic flux generated by the magnets 21 and 22, and, on the other hand, to form a locking means for the half casings 17 and 18, provide the stator with a great strength; the result is that the number of straightening ribs may be reduced.

Moreover, the mounting of the stator is simple without having an effect on the strength of the motor, particularly under the effect of the vibrations to which it is subjected when in operation.

In an alternative, on each half casing are provided bosses integrally formed during molding, for the connection of the motor with the rest of the air-conditioning installation.

Of course, the invention is not limited to the case where the stator has a cylindrical outer shape; it is applicable whatever the outer shape.

So, in one alternative, the stator has an outer parallelepipedal or prismatic shape of polygonal cross-section, the part closing the magnetic field flux and maintaining the two elements of the casing which have then the same cross-section.

For improving the positioning of the bearings 14 and 15 in their housings, it is possible to foresee extra ribs (not shown) between the ribs 37 and 38 and the plane of which is perpendicular to that of said ribs 37 and 38, viz. perpendicular to axis 11a.

In another alternative, the bearings 14 and 15 are roller bearings.

The casing elements of the stator may be made from a non magnetizable material such as for instance "zamac" instead of the plastics material.

Reference is now being made to FIGS. 8 to 26.

The motor comprises a rotor 210 having, mounted on a shaft 211 (FIGS. 8 to 11), an armature 212 and a collector 213. On either side of the assembly formed by the armature 212 and the collector 213, the shaft 211 is supported in bearings 214 and 215 which are part of the stator. Each of said bearings has the same shape as the bearings 14 and 15 (FIGS. 1 to 7) and are mounted in the same manner.

The motor stator comprises also two half casings 217 and 218 made from a non magnetizable plastics material, which are identical and each of which houses, in addition to the rotor 210, a permanent magnet, respectively 219 and 220, as well as a brush, respectively 221 and 222.

A ring 240 of solft iron forms a part or a ring surrounding the half casings 218 and 218. It contributes to the assembly of the latter and closes the magnetic field flux generated by the permanent magnets 219 and 220.

The two half casings being identical, the same constituant parts will be designated by the same reference numerals, and only one of them will be described in detail, that of reference 217.

The half casing 217 (FIGS. 12 to 16) has a base 223 which is in a plane which, when the motor is mounted, passes through axis 211a and the general shape of which is that of a convex polygon symmetrical relative to the axis 211a with two sides 224 and 225 parallel to said axis, the axial position of which is that of the ring 240, one side 226 perpendicular to the axis the axial position of which is that of the bearing 214 and which is connected to the sides 224 and 225 via oblique sides, respectively 227 and 228, and another side 229 perpendicular to the axis having the axial position of bearing 215, being connected to the sides 224 and 225 by other oblique sides, respectively 230 and 231, and which is more remote from sides 224 and 225 than side 226. Said base 223 is adapted for being applied against the corresponding base of the other half casing and fixed thereto by a snapped engagement.

For the centering of the two half casings, each of the latter has, protruding from the base 223, three small frustoconical rods 232, 233 and 234 to which correspond three holes, respectively 232a, 233a and 234a, the frustoconical rods of the half casings being adapted for being engaged into the corresponding holes of the other half casings. The rod 232 is between the sides 229 and 230; the rod 233 is at the end of the side 225 which is close to side 231; the rod 234 is between the sides 226 and 227.

For the snapped engagement of the half casings, two lugs 235 and 236 on one side of axis 211a protrude from the base 223, having each a head formed for being engaged into an opening 235a, 236a of the other half casing, the cross-section of which is of a general rectangular shape and the position of which is symmetrical relative to the axis. The lug 235 is at the end 226 of the base; but is closer to axis 211a than hole 234a. Likewise, the lug 236 is at the end 229 of the base and is closer to the axis than the hole 232a. Similarly, the openings 235a, 236a are closer to the axis than respectively the frustoconical rods 234 and 232.

Between each lug 235 or 236, for instance lug 235, and the corresponding opening 235a, the half casing is formed with a crenel 237 or a recess extending over the major portion of the corresponding side 226. The bottom wall 238 of said crenel is protruding from the base 223 opposite the lugs 235, 236 and from said bottom extend two ribs 239 and 240a perpendicular to the plane of base 223 and parallel to axis 211a, ending by bevel shaped concave edges for mating the outer shape of the corresponding bearing 214 and forming a housing for the latter.

When the motor is mounted, the half casings being associated in a snapped engagement, the ribs are then slightly curved towards the outside and maintain thereby the bearing with a tight fit between their concave ends.

The base 223 is formed by the end edges of walls forming a frame 241 surrounding the half casing, and by edges of some of said walls.

A half crown 242 of axis 211a extends between the ends of sides 224 and 225 which are in the vicinity of the oblique sides 227 and 228. Its object is to receive the ring 240; the diameter of the outer surface of the cylinder which it delimits being therefore equal to the inner diameter of said ring 240. To said half crown is rigidly connected a wall 243 perpendicular to the axis 211a and connected to a half disc 244 of smaller diameter, also centered on axis 211a and rigidly connected to the wall 238 forming the bottom of crenel 237 through two arms or walls 246 and 247 which are part of frame 241, and two other arms 248 and 249 forming a wind-bracing between the half crown 242 and a half disc 244.

Figure 21:
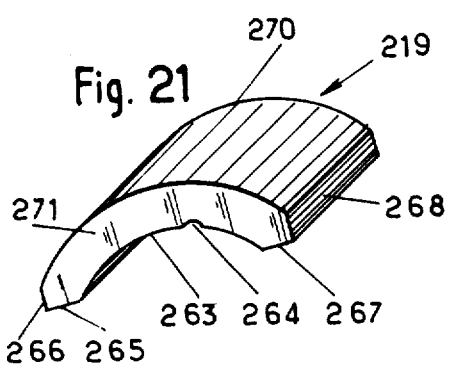
FIG. 21 shows a magnet of the motor illustrated in FIGS. 8 to 11.
Figure 23:
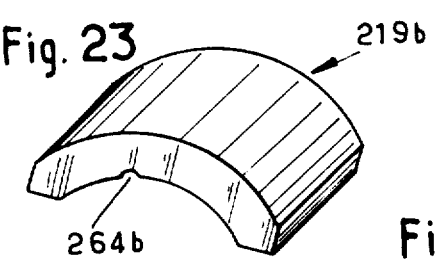

The wall 243 is formed with edges 243a, 243b opposite the half disc 244 the outer surfaces of which delimit also the half crown 242. From said edges, two lugs 250 and 251, which are resilient in an axial direction, are protruding towards the inside of the casing and are placed in symmetrical positions relative to a plane perpendicular to base 223 and passing by axis 211a. Said lugs 250, 251 are adapted for bearing against a transverse face 271 of magnet 219 (FIG. 21). The other transverse face 270 of magnet 219 bears against the free edge 254, 255 of ribs 252, 253 on a transverse wall 256 in the shape of a half crown or half disc between the sides 224 and 225 in the vicinity of the oblique sides 230 and 231. The ribs 252 and 253 have outer surfaces 257, 258 which are on a cylinder of axis 211a and have the same radius as that on which is the outer surface of the half crown 242, said surfaces 257 and 258 forming thus the bearing surfaces for the inner face of ring 240.

The transverse face of wall 256 from which the ribs 252, 253 are protruding, form an abutment for a transverse face of the ring 240.

A bar 260, which is parallel to axis 211a and is in a plane perpendicular to base 223 passing by said axis, connects the walls 243 and 256 in the vicinity of their inner edges, respectively 243c and 256a (FIG. 13). This bar is curved with its convexity turned towards the outside, viz. in the opposite direction to axis 211a so that it can exert, when compressed, and due to its resiliency, a radial effort directed towards the outside. Alternatively, bar 260 can be interrupted.

From the frame 241 are protruding, substantially in the middle of sides 224 and 225 and towards the inside of said frame, two other resilient lugs 261 and 262 of positions symmetrical relative to axis 211a, applying their return forces in a substantially perpendicular direction to basis 223 in the same direction than bar 260.

The magnet 219 (FIG. 21) which has substantially the shape of a portion of a cylindrical ring of circular cross-section, extending over a sector with a centre angle of about 90°, is formed, on its inner face 263, with a groove 264 adapted for housing the bar 260 and its end faces 265, 266, 267 and 268 are in planes parallel to the axis, the face 265 being adapted for resting on the resilient lug 262 (FIG. 9).

When the motor is mounted, the angular position of the magnet 219 is determined by the cooperation of the bar 260 with the groove 264 and said bar 260 as well as the lug 262 pushing back said magnet against the inner face of the ring 240.

With such a disposition, one obtains an angular shift of determined value—intended in a known manner to compensate the armature reaction—between the direction of the magnetic field produced by the magnets 219 and 220 and the radial axis of the brushes. For changing the shift, it is not necessary to modify the position of the brushes and it is enough to modify the position of the magnets, or even more simply, to replace said magnets by others.

Thus, in an alternative, a magnet 219a (FIG. 22) extends over a centre angle of about 120° so that it may rest by one of its ends against the lugs 261 and 262, its groove 264a being in this case substantially on the medium or summit generating line of its inner surface.

In a further alternative (FIG. 23), magnet 219b indentical to magnet 219 but turned with an angle of 180°, bears, when mounted, against lug 261, groove 264b cooperating as previously with bar 260. In this case, the angular shift between the axis of the brushes and the direction of the magnetic field has the same absolute value as in the case shown in FIG. 9, but with a reverse sign.

Lugs 272, 273, which are resilient in a radial direction, extend parallel to axis 211a along sides 224, 225 outside frame 240, in the vicinity of the ends of the half crown 242. They comprise each, outside, a shoulder 272a, 273a (FIGS. 16 and 19), adapted for cooperating with a transverse face 274 of a ring 240 (FIG. 8) for immobilizing the latter in an axial direction, its other transverse face 275 being then in abutment against the face of wall 256. The shoulders 272a, 273a are slanted (FIG. 19) for allowing mounting rings 240 of various width in order to take in account the size dispersion resulting from the manufacture.

Each of said lugs is formed on its end, which is turned in the opposite direction to the wall 256, with chamfers 276, 277 for making easy the mounting of ring 240 and taking up the plays.

Said lugs 272 and 273 being in the space separating the walls 243 and 256 and not beyond the walls 243 towards the output shaft or end 211b, the volume of the motor on the side of said output shaft is reduced to a minimum, with the space which is free being eventually occupied by the fan driven by the output shaft, thereby allowing reducing to the minimum the volume occupied by the assembly formed by the motor and the fan driven by said motor.

Flat metallic blades 280, 281 forming the supply electric terminals of the motor extend parallel to the axis 211a, symmetrically relative to the latter. Each of said blades is in the vicinity of the wall 256 opposite the ring 240 relative to said wall and in the vicinity of the ends of the half crown which it forms which bear against the sides 224 and 225 of base 223.

Each blade, for instance that referenced 280 (FIG. 18a), is formed at its rear end with a resilient strip 282 exerting its return force perpendicularly to the blade 280 when the latter is moving away, and which is adapted for cooperating, via its end 283, with an abutment 284 of a half casing for the fixation of said blade 280 to the casing.

Figure 18:
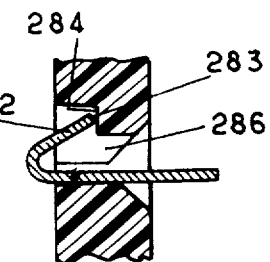
FIG. 18 is a sectional view at a larger scale of another portion of the casing element and of a terminal connector for the electric connection of the motor.
Figure 18A:
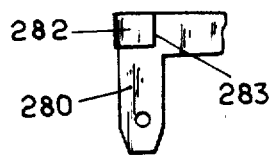
FIG. 18a shows a terminal connector for the electric connection.
Figure 20:
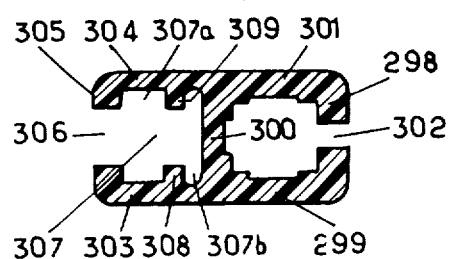
FIG. 20 shows at a larger scale a sectional view along line 20—20 of FIG. 15.
Figure 19:
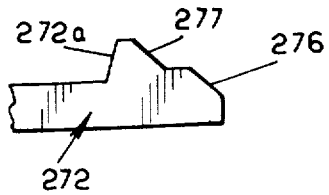
FIG. 19 is also a view at a larger scale of a portion of the casing element.

To this effect, the half casing 217 comprises outside the frame 241 in the vicinity of the end of the half crown formed by the wall 256 which is towards the side 225, a slot 285 (FIGS. 12 and 13) with a portion 285a of small width providing a passage for the blade 280 according to its thickness, and a portion 285b of larger width providing a passage for blade 280 and for the lug 282 brought nearer to said blade due to its resilience. In a position symmetrical to axis 211a is foreseen a further slot 286 corresponding to slot 285b and ending by the abutment face 284 against which the end 283 of the lug 282 comes to rest when it is extending out of the slot 286 (FIG. 18).

This arrangement allows an easy mounting of the motor in a parallel direction with the axis.

As an alternative, the abutment face 284 is provided on the same side as slot 285.

To the wall 256 is rigidly connected an arm 290 substantially parallel to axis 211a opposite the bar 260, and it connects said wall 256 to the housing 291 provided for the brush 221.

The arm 290 is formed with a recess 292 for housing the end 293 (FIG. 8) of the cylindrical core 294 of an anti-interference inductance 295 electrically connected on the one hand to the blade 280 and on the other hand to the brush 221. The other end 296 of core 294 rests on the bottom of a recess 297 (FIGS. 12 and 16) formed on the upper edge of the frame 241 in the vicinity in an axial direction of the slot 285, but more remote from the wall 256 than the latter.

The housing 291 has an axis 291a perpendicular to the base 223, extending through axis 211a. It comprises four walls 298, 299, 300 and 301 (FIG. 20) forming together a rectangle parallelepiped, the wall 298 of which is rigidly connected to the arm 290 formed with a radial slot 302 for the passage of the electric wire 303 (FIG. 8) of a connection with the inductance 295.

The walls 299 and 301 are extending in an axial direction, opposite bar 290, into walls 303, 304, the end edges of which 303a, 304a (FIG. 15) parallel to the axis are closer to the latter than the corresponding end edges of the walls 299 and 301. Said walls 303, 304 end at right angles with the left hand side end of the casing 217 element by another wall 305 parallel to wall 300, and having on its upper portion a wide cut 306 providing passage for a threaded rod or similar adapted for the fixation of the motor to the casing or framework of an air-conditioning installation on a motor vehicle.

The walls 300, 303, 304 and 305 delimit a housing 307 separated into two portions 307a and 307b by ribs 308 and 309 formed inside the housing 307, on the walls 303 and 304. The portion 307b is adapted for housing the head of a screw while the portion 307a is adapted for housing a nut.

The bottom of the housing 307 is provided by the wall 310 forming on its other face the bottom of crenel 237a similar to crenel 237 on the right hand side end of the casing 217 element.

The immobilization in a longitudinal direction of the rotor relative to the stator is provided by a metallic washer 320 (FIGS. 8, 10 and 11) of the "circlip" type—that is due to a washer immobilized relative to the shaft in an axial direction by engagement with the teeth formed on it with a slot of said shaft—fixed on the shaft 211 opposite the end 211b, a nylon washer 231 being interposed between the metallic washer 320 and the transverse face of the bearing 215 turned towards the outside and a nylon washer 322 (FIG. 11) placed between the end face of the collector 213 and the inner transverse face of the bearing 215.

In an alternative embodiment, no metallic washer of the "circlip" type engaging a groove of the shaft is foreseen, but instead washers are mounted about the shaft 211, one of them between the inner transverse face of the bearing 215 and the end face of the collector 213 (as is washer 322) and the other between the inner transverse face 214a of the bearing 214 and the transverse end face 212a of the armature 212.

For compensating the gradual wear of such washers, the assembly of the stator relative to the rotor is effected so that at least one of the washers is prestressed in an axial direction. Three embodiments of such a disposition will now be described with reference to FIGS. 24, 25 and 26.

In a first embodiment (FIG. 24), the end face 213a of the collector 213 comprises a central chamber 325 of same diameter than the periphery of the end face 215a of bearing 215. Between the transverse faces 213a and 215a is interposed a teflon washer 326 mounted on the shaft 211 and formed with a flat outer crown 327 and a central crown 328, with convex bulging faces, one of which 328a being in engagement against face 215a of the bearing 215 and the other 328b being partly introduced inside the chamber 325, the engagement between said washer 326 and the face 213a being effected via the flat outer portion 327.

The assembly is effected so that the washer 326 is flexed, the bulging face 328b being brought nearer the bottom of chamber 325.

When the shaft rotates, it drives in rotation the washer 326.

In another embodiment (FIG. 25), the axial prestress is obtained by disposing about the shaft 211 and against the bottom of chamber 325 of the end face 213a of the collector 213 a neoprene washer 230 having a thickness larger than the depth of said chamber, and between the neoprene washer and the end face 215a of bearing 215, a metallic washer 331 the friction wear of which against the end face of the bearing being less important than would be that of washer 330 if it was applied directly against face 215a. In this example, the prestress is obtained by a compression of the washer 330 in the direction of axis 211a, whereas in the embodiment shown in FIG. 24, the prestress is obtained by a shearing resilience.

In a further embodiment (FIG. 26), is foreseen for the prestress in an axial direction, on the one hand a metallic washer 332 made of a spring steel and having a diameter larger than the diameter of chamber 325 of collector 213 and which is mounted about shaft 211 and applied against the end face 213a of said collector 213 and, on the other hand, by a washer 333 between said washer 332 made of a spring steel and the end face 215a of bearing 215. The washer 333 is also metallic. The prestress is obtained by the shearing resilience of washer 332.

Alternatively magnet 219 presents a rib instead of a groove and the casing element comprises two bars 260 between which the rib is received.

I claim:

1. In a rotating electric machine, a stator comprising induction means and a casing formed of two separable non-magnetic elements, a magnetizable integral cylindrical holding piece disposed outside said casing for holding said two separable non-magnetic elements in abutment one with the other, said magnetizable integral holding piece forming a closed circuit for the magnetic field flux of said induction means, said separable non-magnetic elements of the casing being identical with each other and applied one against the other along a plane passing through the axis of the rotating machine, each elements of the casing having first and second outer axial abutments, between which the holding piece is maintained, the first abutment being stationary and the second abutment being resilient in a radial direction so that it may be retracted for allowing the axial mounting of said holding piece on said casing.

2. A stator according to claim 1 wherein said resilient axial abutment has an abutment edge which is slanting relative to a plane perpendicular to the axis of the rotating machine.

3. A stator according to claim 1 wherein said resilient axial abutment is at the end of an axial lug which, when the holding piece is mounted, is under said holding piece.

4. A stator according to claim 1 wherein the induction means comprise two permanent magnets, one in each element of the casing, and each element of the casing further comprises at least two resilient lugs for applying the corresponding permanent magnet against the inside surface of said holding piece.

5. A stator according to claim 4 wherein each element of the casing comprises an abutment for maintaining the corresponding magnet in an axial direction.

6. A stator according to claim 1 wherein each element of the casing comprises two ribs parallel to the axis and on either side of said axis for holding a bearing for a shaft of the machine, each rib having a bevelled edge for mating an outer shape of said bearing.

7. A stator according to claim 6, wherein snapping engagement means are provided on either side of the ribs for maintaining the bearings with a close fit between the edges of the ribs.

8. A stator according to claim 1, wherein each element further comprises a housing for a brush and a housing for an anti-interference inductance, the said housings being arranged in an axial direction between said holding part and means for retaining a fixation member of the machine to a framework.

9. A stator according to claim 1 wherein the induction means comprises two permanent magnets, one in each element of the casing and each of said element including a housing for a brush, each magnet being formed with a means for cooperating with a complementary mating portion of the element of the casing for fixing the angular position of said magnet relative to the casing and thereby relative to said brush.

10. A stator according to claim 9 wherein said means has a groove on said permanent magnet and a bar on the corresponding element cooperating with said groove, said bar being resilient in a radial direction for applying said magnet against the inner face of the holding part.

* * * * *